Feb. 13, 1951 F. E. DUCEY Re. 23,339
INFANT'S CHAIR
Original Filed July 1, 1948
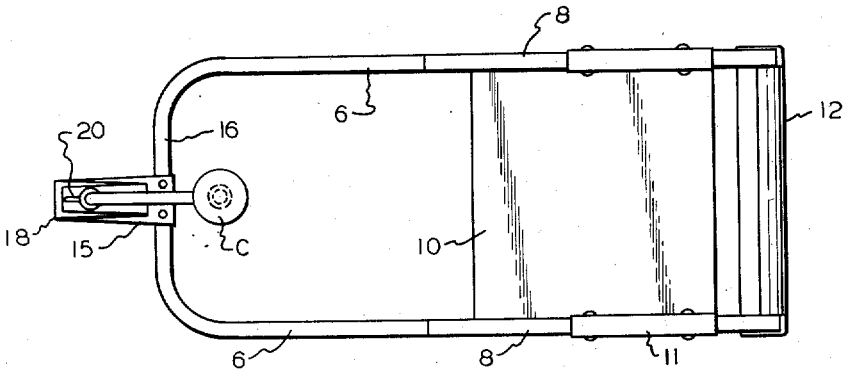
FIG. II.
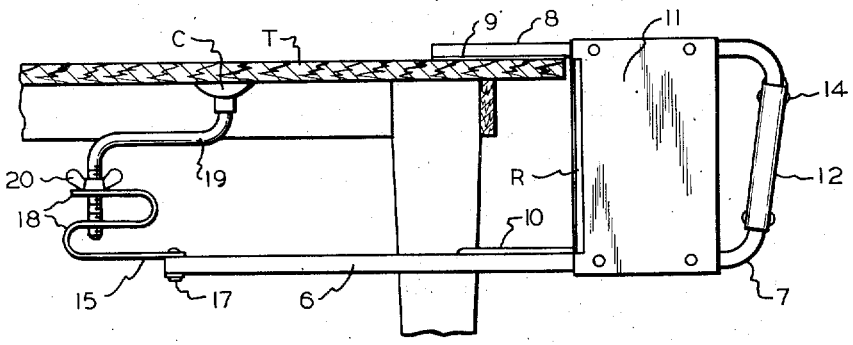
FIG. I.
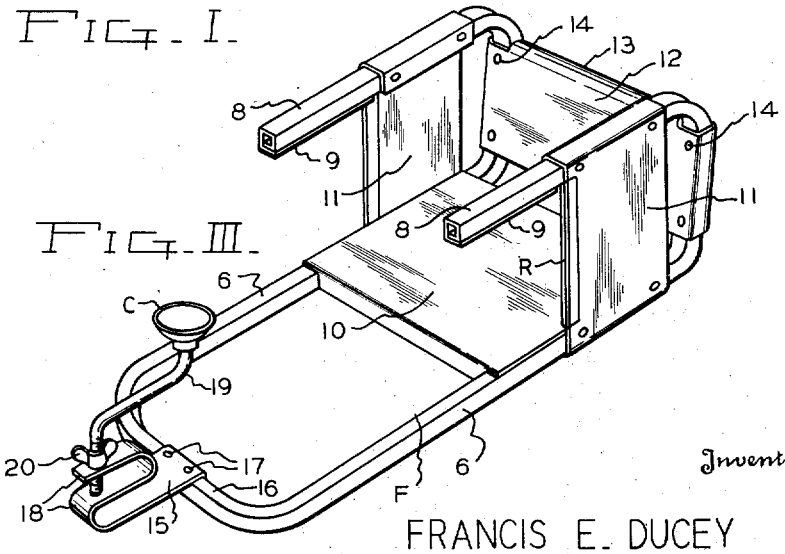
FIG. III.
Inventor
FRANCIS E. DUCEY
By Townsend F. Beaman Reissued Feb. 13, 1951

Re. 23,339

UNITED STATES PATENT OFFICE 23,339

INFANT'S CHAIR

Francis E. Ducey, Phoenix, Ariz.

Original No. 2,489,084, dated November 22, 1949, Serial No. 36,473, July 1, 1948. Application for reissue July 8, 1950, Serial No. 172,641

7 Claims. (Cl. 155—78)

Matter enclosed in heavy brackets [ ] appears in the original patent but forms no part of this reissue specification; matter printed in italics indicates the additions made by reissue

This invention relates to infants' chairs, and more particularly to a chair which is easily and quickly attachable to and/or detachable from a table or other article of household furniture.

One of the prime objects of the invention is to design an infant's chair formed of relatively inexpensive, durable, lightweight materials, and which can be readily attached to a table without the use of brackets or other similar securing means.

A further object is to provide an infant's chair so designed and constructed that it cannot be tipped over and thereby injure the occupant, and which can be readily adjusted to suit the table or other support to which it is attached.

Another object is to design a practical, non-tiltable infant's chair for use in homes, hotels, restaurants and similar establishments, which is comfortable in use, which occupies a limited space when not in use, and which can be quickly and easily attached to any conventional design of table or other support.

Still a further object is to design a chair which when in position, maintains the occupant of the chair at the proper height with relation to the face of the table, regardless of the height of the table or support on which it is mounted.

To the accomplishment of the foregoing and related ends, said invention then consists of the means hereinafter fully described, and particularly pointed out in the claims, the annexed drawing and following description setting forth, in detail, certain means and one mode of carrying out the invention, such disclosed means and mode illustrating, however, but one of the various ways in which the principle of the invention may be used.

In the drawing:

Fig. 1 is a side-elevational view of my infant's chair, showing it attached to a conventional table which is shown in section.

Fig. 2 is a top, plan view with the table omitted.

Fig. 3 is an isometric view of the chair.

In the illustrative form herein shown, the chair comprises a U-shaped main frame F, preferably formed of magnesium the legs 6 of which are spaced-apart, the rear ends being bent upwardly as at 7, and thence forwardly to form arms 8, said arms overhanging the legs 6 to accommodate a food tray (not shown). These arms 8 bear on the top face of the table T when the chair is in position, and a resilient rubber pad 9 is provided on the lower face of each arm, and contacts the face of the table to prevent slipping, marring or injury to the finish.

A seat panel 10 also formed of sheet magnesium spans the rear ends of the frame members 6, and side and back panels 11 and 12 respectively form the walls of the seat, these panels being preferably formed of light-weight sheet metal so that the entire structure will be of minimum weight and easy to handle and position, and a channel shaped strip of rubber R or the like covers the front edge of the panel 11 to form a smooth edge, etc.

The back member 12 is also turned as shown at 13 to form a smooth edge at the top, these back and side panels being held in position by means of rivets 14 or in any other similar manner.

One end of a resilient strap 15 is secured to the transversely disposed section 16 of the main frame by means of bolts or rivets 17, said strap being folded to form spaced-apart sections 18 suitably bored and threaded to accommodate the lower end of a threaded bracket member 19, and a vacuum cup C is mounted on the upper end thereof, for engagement with the underside of the table T or other support to which the chair is attached, a wing nut 20 being provided on the threaded section of the support 19 and is adjustable to suit the height desired, the strap 15 providing the desired resiliency.

The chair can be readily mounted on a table; it is merely necessary to tilt the structure, moving the front end inwardly beneath the table until the free ends of the arms 8 overhang the top face of the table. It is then swung horizontally so that the resilient pads rest or bear on the top face of the table, and the vacuum cup bears against the bottom surface thereof, the vacuum cup and the bearing surfaces eliminating noise or marring of the contacting surfaces and preventing slippage or shifting of the chair with relation to the table.

From the foregoing description, it will be obvious that I have perfected a very simple, practical, and economical, non-tiltable infant's chair which can be readily and easily mounted on or removed from a table or other support.

What I claim is:

1. An infant's chair of the class described, comprising a frame formed with forwardly projecting legs, a vertically adjustable bracket connected to said legs, a vacuum cup on the upper end of said bracket and adapted to bear against the lower face of a support, the opposite end of the legs extending upwardly and thence horizontally to form overhanging arms adapted to bear on the top face of the support at a point spaced outwardly from the bearing point of the bracket, and a seat and back respectively provided on said frame.

2. A construction as set forth in claim 1 in which a resilient means is secured to the leg structure, and in which the lower end of the bracket is adjustably mounted.

3. The chair construction defined in claim 1 in which a resilient S-shaped strap is secured to the forward end of the legs, and the bracket has upper and lower vertical portions offset horizontally and provided with a vacuum cup on its upper end with its lower end adjustably connected to said strap.

4. In an infant's chair of the class described, comprising a main frame formed with forwardly projecting legs transversely connected at their forward ends, the rear ends of said legs being turned upwardly and thence horizontally to form projecting arms, an S-shaped resilient member attached to the transverse leg connecting section, a bracket having vertical, horizontally offset sections adjustably mounted in said S-shaped member and having a resilient suction member on the upper end thereof, and means for locking said bracket in set position with relation to the resilient member.

5. The combination as described in claim 4 in which resilient pads are provided on the lower face of the overhanging arm members.

*6. A table top supported infant chair of the type described comprising a lower horizontally disposed frame of U-shape at its forward end, an upwardly extending adjustable abutment supported centrally upon the forward closed end of said frame, frame parts at the rearward end of said first frame extending upwardly and then forwardly above and in spaced relation to the sides of said U-shaped frame, to terminate in end portions at approximately the mid-point of said sides, a seat panel extending between said sides at the rearward end of said first frame, a back panel extending between said upwardly extending parts, members extending between the said sides and said forwardly extending parts adjacent said back panel and rearwardly of said end portions, resilient friction members on said end portions to constitute upper and two-point support for the chair upon the table top, said abutment having a resilient friction face to provide a third point of support against the underside of the table top at a point between said upper two-point support.*

*7. An infant chair of the type disclosed comprising a seat, a pair of members extending upwardly from the rear of said seat and then projecting forwardly, said members terminating in spaced parallel portions having resilient friction surfaces engageable with the table top with spaced two-point support, a U-shaped frame extending forwardly from the front of said seat, said seat being rigid with said upwardly extending members and said U-shaped frame, and an upwardly extending adjustable abutment centrally supported upon the closed end of the said U-shaped frame to engage with the underside of the table to provide with said spaced parallel portions, a three-point support, said abutment having a resilient friction face.*

FRANCIS E. DUCEY.

REFERENCES CITED

The following references are of record in the file of this patent or the original patent:

UNITED STATES PATENTS

| Number | Name | Date |
|---|---|---|
| 367,175 | Bachlott | July 26, 1887 |
| 827,125 | Turner | July 31, 1906 |
| 2,090,176 | Besancon | Aug. 17, 1937 |
| 2,451,667 | Ducey | Oct. 19, 1948 |

FOREIGN PATENTS

| Number | Country | Date |
|---|---|---|
| 139,107 | Great Britain | Feb. 26, 1920 |